Figure 1:
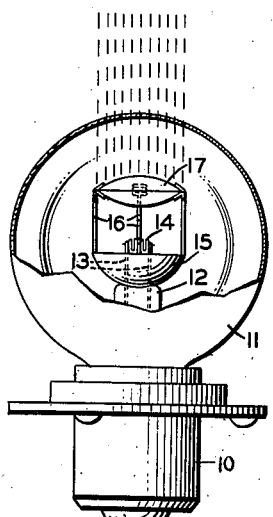

March 24, 1942.  C. H. WYSS, JR  2,277,193
RADIANT ENERGY DIRECTIVE DEVICE
Filed July 11, 1940

INVENTOR
C. H. WYSS, JR.
BY
ATTORNEY

Patented Mar. 24, 1942

2,277,193

UNITED STATES PATENT OFFICE 2,277,193

RADIANT ENERGY DIRECTIVE DEVICE

Clement H. Wyss, Jr., Tuckahoe, N. Y., assignor to The Western Union Telegraph Company, New York, N. Y., a corporation of New York Application July 11, 1940, Serial No. 344,840

8 Claims. (Cl. 176—34)

This invention relates to radiant energy emitting devices and particularly to radiators incorporating instrumentalities for directing the energy in a desired manner.

Although not limited thereto, the invention is disclosed in connection with an emitter of radiant energy having a frequency within the visible spectrum, the illustrative emitter being, in this case, an electric lamp.

It is an object of this invention to provide means whereby a plurality of elements may be arranged relative to one another and to a wave energy radiator in a manner to produce a predetermined distribution of the wave energy.

It is an object of the present invention to provide a structure whereby a plurality of flux controlling elements may be arranged relative to one another and to a filament in a manner to produce a predetermined distribution of substantially all of the light flux emanating from the filament.

Another object of the invention is to provide a novel arrangement of a reflector, lens, and filament, all mounted within a transparent envelope whereby a simple structure is obtained, the light is efficiently used and an accurate adjustment of the elements used to control the beam of light may be made before mounting in an envelope.

Another object of the invention is to provide means for placing a concave reflector and a condensing lens in such proximity to a source of light that a maximum of light may be controlled by means of instrumentalities having minimum dimensions, thereby reducing the material and manufacturing costs.

The instant invention makes possible the assembly of a reflector, a condensing lens, and a filament so that the combination may be placed inside of a bulb or envelope. By assembling these elements as a unit before placing them in an evacuated envelope, the relative dispositions thereof may be effected with a high degree of precision whereby the light emanating from the filament may be accurately controlled. In this manner quantities of such lamps may be made and each lamp will have the same characteristics as those of all the other lamps similarly made. This is an important feature or result obtained by this invention because lamps of this type may be employed in a large number of different types of systems. For example, the light rays may be brought to a focus at a point which is at any desired distance from the central point of the lamp. Such a lamp may be utilized in a facsimile scanning device, thereby making it unnecessary to use the complicated optical systems now in use. The present type of facsimile system uses a source of light in combination with a system of lenses for the purpose of concentrating a relatively small portion of the available light at the desired point. Consequently, when it becomes necessary to replace one of the light sources used in a system of this type, it is frequently necessary to make extensive adjustments of the optical system. Such adjustments are unnecessary in a system utilizing a source of light in accordance with the instant invention. Obviously numerous other uses may be made of the improved electric lamp provided by the instant invention.

Figure 2:
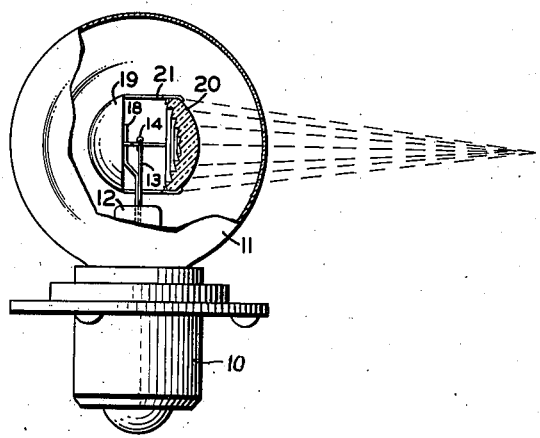
Figure 3:
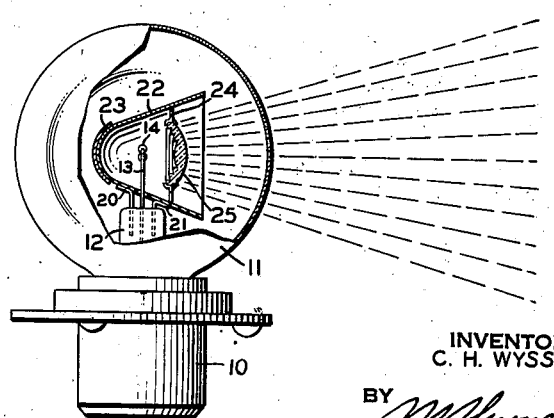

The invention is more fully disclosed hereinafter by the following description which is taken in conjunction with the accompanying drawing, of which:

Fig. 1 illustrates one embodiment of the invention wherein a reflector, a filament and a lens are arranged in line with the vertical axis of a lamp bulb;

Fig. 2 is a modification of the invention wherein a spherical reflector, a filament and a condensing lens are arranged in a line running at right angles to the vertical axis of a light bulb; and Fig. 3 is another modification of the invention utilizing a combination spherical and parabolic reflector, a filament and a condensing lens arranged in a line running at right angles to the vertical axis of a lamp bulb.

Having reference first to Fig. 1, the electric lamp is provided with a bayonet type base 10 of the character which permits prefocusing and which is attached to one end of a transparent envelope 11. Extending from the base to the interior of the envelope is an insulating stem 12 which preferably is formed of glass or some equivalent material. Encased within the stem 12 are two spaced conducting rods 13, between the upper ends of which is supported a filament 14. The supporting rods extend downward through the stem 12 and are connected to the base 10 in a manner which is well-known in the art. A concave reflector 15 is supported directly by the upper end of the stem 12. This reflector is substantially spherical, the center of the spherical surface being substantially at the center of the filament 14.

A plurality of up-standing supporting rods 16 are attached to the outer edge of the reflector 15. As shown in the drawing, these rods are four in number and evenly spaced around the upper edge of the reflector. Each of the supporting rods has formed at the upper end thereof a claw-like structure and serves to support a double convex condensing lens 17.

It will be evident that the filament, the reflector, and the lens may be fastened to the supporting stem 12 before the envelope is placed around them and subsequently evacuated. Thus, these instrumentalities which are employed to control the flux emanating from the filament may be precisely spaced relative to one another and to the filament in such a manner that the flux may be accurately controlled. Also, the disposition of these elements with respect to the base 10 may be made uniform so that all lamps made by the same standards may be used interchangeably.

In this case the light rays which are directed downward from the filament 14 are intercepted by the inner reflecting surface of the reflecting member 15 and are directed back through the center of the source where they are added to the light rays which are initially directed upward from the filament. These direct and reflected rays then impinge upon the under side of the condensing lens 17 and, as is well-known in the art, these rays strike the under surface of the lens at a considerable number of different angles. However, in passing through the lens the light rays are bent in accordance with the well-known refracting properties of a lens of this type and finally emerge from the upper surface of the lens as parallel rays.

Thus, it is seen that substantially all of the light emanating from the source is utilized and controlled in such a manner that a beam of light is produced which is uniform in cross-section throughout its entire length. Not only is this result accomplished in one lamp, but by adjusting the light controlling elements according to the same standards before insertion into the envelope, a great number of such lamps may be produced and the characteristics of the light beam given off by the lamp will be the same for all lamps made according to the same adjustments.

Fig. 2 shows a silghtly different arrangement of the light controlling elements. In this embodiment the filament 14 is supported by means of a pair of spaced rods 13 which are inserted in the insulating stem 12. A second pair of supporting rods 18 are also spaced from one another and inserted in the stem 12. To the upper portions of these rods is attached at its edges a spherical reflecting member 19 which, in this case, is disposed at one side of the filament 14. A condensing lens 20 supported at the ends of a plurality of arms 21 extending from the open edge of the reflector 19 in much the same manner as the lens 17 of Fig. 1 is supported in spaced relation to the reflector 15. In this case, however, the lens 20 which is of a substantially concavo-convex configuration is disposed on the opposite side of the filament to that of the reflector 19.

The action of the spherical reflector 19 is substantially the same as the reflector 15 previously described. The light rays which impinge upon the concave side of the lens 20 from a number of different angles are redirected as they pass through the lens in such a manner that they converge at a focus which is located at a predetermined distance from the filament 14. Such a combination is one which is particularly useful in the facsimile work previously referred to. Here again the adjustment and alignment of the flux controlling elements may be made with a high degree of precision whereby the focal point of the light rays emerging from the lamp is always the same distance from the center of the lamp at which the filament 14 is located.

A third modification of the invention is depicted in Fig. 3. The filament 14 is again supported between a pair of conducting rods 13 protruding upward from the stem 12. A second pair of spaced rods 20 and 21 also extend upward from the top of the stem and serve to support a parabolic reflecting member 22. This reflector is so disposed with reference to the light source that the filament 14 is substantially at the focal point of the parabolic surface. The closed portion of the reflecting surface 23 is substantially spherical. A plurality of supporting rods 24 extend inwardly from the reflecting surface of the parabolic member 22 at points adjacent to the open part of the reflector. These supporting rods are provided with means for gripping the edges of a concavo-convex condensing lens 25.

The combination of the parabolic and spherical reflecting surfaces and the condensing lens disposed on opposite sides of the filament function to intercept and redirect substantially all of the light rays emanating from the filament in such a manner that they emerge from the lamp as divergent rays thereby producing a beam of light which is suitable for floodlighting or a similar purpose.

While the invention has been described and disclosed by means of a number of specific embodiments, it is contemplated that these various forms serve as illustrative arrangements only. Various combinations of the instrumentalities herein disclosed may be utilized in addition to others which may be suggested to those skilled in the art without departing from the spirit of the invention. Also, other forms of lenses and/or reflectors may be employed. The invention is obviously not limited to use with electric lamps, but may also be employed, with or without the glass envelope, with devices for directing radiant energy having wave lengths, or frequencies, lying without the visible spectrum. Consequently, it is desired that all such modifications which fall within the scope of the appended claims be construed as part of the instant invention.

What is claimed is:

1. A controlled flux electric lamp comprising, a transparent envelope, a base for said lamp formed at one end of said envelope, an insulating stem extending from said base to the interior of said envelope, a filament mounted at the interior end of said stem and a unitary structure comprising a reflector and a lens mounted on said stem, said reflector and said lens being disposed on opposite sides of said filament.

2. A controlled flux electric lamp comprising, a transparent envelope, a base for said lamp formed at one end of said envelope, an insulating stem extending from said base to the interior of said envelope, a filament mounted at the interior end of said stem, a reflector mounted on said stem and spaced a predetermined distance on one side of said filament, and a lens mounted on said reflector and spaced a predetermined distance on the other side of said filament.

3. A controlled flux electric lamp comprising, a transparent evacuated envelope, a base for said lamp formed at one end of said envelope, an insulating stem extending from said base to the interior of said envelope, a filament mounted at the interior end of said stem, a curved reflecting surface mounted on said stem at a predetermined distance on one side of said filament, and a condensing lens mounted on said reflector and spaced a predetermined distance on the other side of said filament.

4. A controlled flux electric lamp for producing a beam of light having a uniform cross-section comprising, a transparent envelope, a base for said lamp formed at one end of said envelope, an insulating stem extending from said base to the interior of said envelope, a spherical reflector mounted with its concave side upward on the upper end of said stem, a filament mounted at the upper end of said stem at the center of curvature of said reflector, and a double convex condensing lens supported from said reflector a predetermined distance above said filament.

5. A controlled flux electric lamp for producing a beam of light which is convergent at a point a predetermined distance from said lamp comprising, a transparent envelope, a base for said lamp formed at one end of said envelope, an insulating stem extending from said base to the interior of said envelope, a spherical reflector supported from said stem, a filament mounted on said stem at the center of curvature of said reflector, and a concavo-convex condensing lens supported from said reflector on the opposite side of said filament from the reflector.

6. A controlled flux electric lamp comprising, a transparent envelope, a base for said lamp formed at one end of said envelope, an insulating stem extending from said base to the interior of said envelope, a reflector having a composite parabolic and spherical configuration supported by said stem, a filament mounted on said stem and located at the focal point of the parabolic portion of said reflector, and a concavo-convex condensing lens supported from said reflector adjacent the end thereof.

7. A radiant energy directive device comprising, an envelope, a base for said device formed at one end of said envelope, an insulating stem extending from said base to the interior of said envelope, an emitter of radiant energy mounted at the interior end of said stem, and a unitary structure comprising a reflector and a refractor mounted on said stem, said reflector and said refractor being disposed on opposite sides of said emitter.

8. A radiant energy directive device comprising, an envelope capable of transmitting radiant energy, a base for said device formed at one end of said envelope, an insulating stem extending from said base to the interior of said envelope, an electrically excited radiator of radiant energy mounted at the interior end of said stem, and a unitary structure comprising a reflector and a lens mounted on said stem, said reflector and said lens being disposed on opposite sides of said radiator.

CLEMENT H. WYSS, JR.